(12) United States Patent (10) Patent No.: US 9,033,626 B2
Leishman et al. (45) Date of Patent: May 19, 2015

(54) MULTIPLE ZONE COOLING APPARATUS

(71) Applicant: PRATT & WHITNEY CANADA CORP., Longueuil (CA)

(72) Inventors: James Leishman, Longueuil (CA); Fuat Atabey, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 14/302,871

(22) Filed: Jun. 12, 2014

(65) Prior Publication Data

US 2014/0286720 A1 Sep. 25, 2014

Related U.S. Application Data

(62) Division of application No. 12/821,213, filed on Jun. 23, 2010, now Pat. No. 8,784,022.

(51) Int. Cl.
*B23Q 1/00* (2006.01)
*B23Q 11/10* (2006.01)

(52) U.S. Cl.
CPC ............ *B23Q 11/10* (2013.01); *B23Q 11/1076* (2013.01); *B23C 2250/12* (2013.01)

(58) Field of Classification Search
CPC . B23Q 11/10; B23Q 11/1076; B23C 2250/12
USPC ................................ 409/136, 135; 408/56, 61
See application file for complete search history.

(56) References Cited

U.S. PATENT DOCUMENTS

| | | | |
|---|---|---|---|
| 3,868,195 | A | 2/1975 | Anderson et al. |
| 4,213,354 | A | 7/1980 | Dahinden |
| 5,190,421 | A | 3/1993 | Wen et al. |
| 5,358,360 | A | 10/1994 | Mai |
| 5,388,487 | A | 2/1995 | Danielsen |
| 5,993,121 | A | 11/1999 | Fiesta |
| 5,993,297 | A | 11/1999 | Hyatt et al. |
| 6,715,971 | B2 | 4/2004 | Curtis |
| 7,134,812 | B2 | 11/2006 | Beckington |
| 7,182,674 | B2 | 2/2007 | Mundt |
| 7,393,268 | B2 | 7/2008 | Schrottner |
| 2007/0077132 | A1 | 4/2007 | Beckington |

*Primary Examiner* — Moshe Wilensky
(74) *Attorney, Agent, or Firm* — Norton Rose Fulbright Canada LLP

(57) ABSTRACT

A cooling assembly for a machine tool including at least first and second nozzle rings mounted on the spindle housing, respectively defining first and second coolant conduits and respectively including first and second pluralities of nozzles in fluid communication with the respective conduit. Each first nozzle is oriented with an outlet thereof directed toward a first machining zone containing cutting edges of at last one tool having a first length. Each second nozzle is oriented with an outlet thereof directed toward a second machining zone different from the first machining zone and containing the cutting edges of at least one tool having a second length.

4 Claims, 7 Drawing Sheets

MULTIPLE ZONE COOLING APPARATUS

CROSS-REFERENCE TO RELATED APPLICATION

This application is a divisional of U.S. patent application Ser. No. 12/821,213 filed Jun. 23, 2010, the entire content of which is incorporated herein by reference.

TECHNICAL FIELD

The application relates generally to CNC machining and, more particularly, to a cooling apparatus for a CNC machine using tools of various gauge lengths.

BACKGROUND OF THE ART

Multi-axis CNC (computer numerically controlled) machine tools are often used to produce components, for example gas turbine engine components, machined from solid material. This machining process is sensitive to the accurate delivery of coolant fluid into the machining zone, as deficiencies in coolant fluid delivery may result in inadequate chip flushing with subsequent degradation of the component's surface finish, tool breakage, and destruction of the component and/or of the machine.

Components are typically machined using cutting tools of various lengths, usually requiring that the machine operators manually align the machine's coolant delivery nozzles to suit the length of the next tool used. Also, line of sight between the coolant nozzle and the machining zone changes angularly around the centre of tool rotation during the machining process, and depending on the position of the nozzles, the un-machined material may block or deflect the coolant flow away from the cutting zone.

Improvements in the cooling of CNC machine tools are thus sought.

SUMMARY

In one aspect, there is provided a cooling apparatus for a CNC machine tool having a stationary spindle housing supporting a spindle for rotating about an axis of rotation a selected one of a plurality of interchangeable cutting tools including at least a first tool having a first length and a second tool having a second length different from the first length, the apparatus comprising a first nozzle ring mounted on the spindle housing and at least substantially encircling the spindle, the first nozzle ring defining a first coolant conduit and including a plurality of first nozzles in fluid communication with the first conduit and distributed around the first nozzle ring, each first nozzle being oriented with an outlet thereof directed toward a first machining zone extending along the axis of rotation, wherein cutting edges of the first tool are within the first machining zone when the first tool is installed in the spindle, a second nozzle ring mounted on the spindle housing concentric with the first nozzle ring, the second nozzle ring defining a second coolant conduit independent from the first coolant conduit and including a plurality of second nozzles in fluid communication with the second conduit and distributed around the second nozzle ring, each second nozzle being oriented with an outlet thereof directed toward a second machining zone extending along the axis of rotation and different from the first machining zone, wherein cutting edges of the second tool are within the second machining zone when the second tool is installed in the spindle, and a fluid distribution system having at least first and second configurations, the fluid distribution system in the first configuration pressurizing and circulating a coolant fluid from a coolant source to the first conduit only, the fluid distribution system in the second configuration pressurizing and circulating the coolant fluid from the coolant source to the second conduit only.

In another aspect, there is provided a cooling assembly for a machine tool, the assembly comprising an annular manifold including at least first and second concentric fluid passages defined therein, the first and second passages being sealed from one another, the annular manifold defining a central longitudinal axis and including first and second fluid inlets in fluid communication with the first and second passages, respectively, a plurality of first nozzles extending from a front side of the manifold and distributed around a circumference thereof, each of the first nozzles being in fluid communication with the first passage and being oriented such that an outlet thereof is directed toward at least part of a same first portion of the longitudinal axis, the first portion being frontwardly offset from the first nozzles, and a plurality of second nozzles extending from the front side of the manifold and distributed around the circumference thereof, each of the second nozzles being in fluid communication with the second passage and being oriented such that an outlet thereof is directed toward at least part of a same second portion of the longitudinal axis, the second portion being different from the first portion and frontwardly offset from the second nozzles.

In a further aspect, there is provided a method of machining a part with a machine tool having a stationary spindle housing supporting a spindle for rotating a selected one of a plurality of interchangeable cutting tools about an axis of rotation, the method comprising engaging a first one of the tools with the spindle such that cutting edges of the first tool are located in a first machining zone extending along a first portion of the axis of rotation, directing coolant fluid to the first machining zone using at least a first nozzle ring mounted on the housing and including first nozzles directing the coolant fluid toward the first machining zone, machining the part with the first tool, removing the first tool from the spindle, engaging a second one of the tools with the spindle such that cutting edges of the second tool are located in a second machining zone extending along a second portion of the axis of rotation different from the first portion, directing the coolant fluid to the second machining zone using at least a second nozzle ring mounted on the housing and including second nozzles directing the coolant fluid toward the second machining zone, and machining the part with the second tool.

DESCRIPTION OF THE DRAWINGS

Reference is now made to the accompanying figures in which.

DETAILED DESCRIPTION

Figure 1:
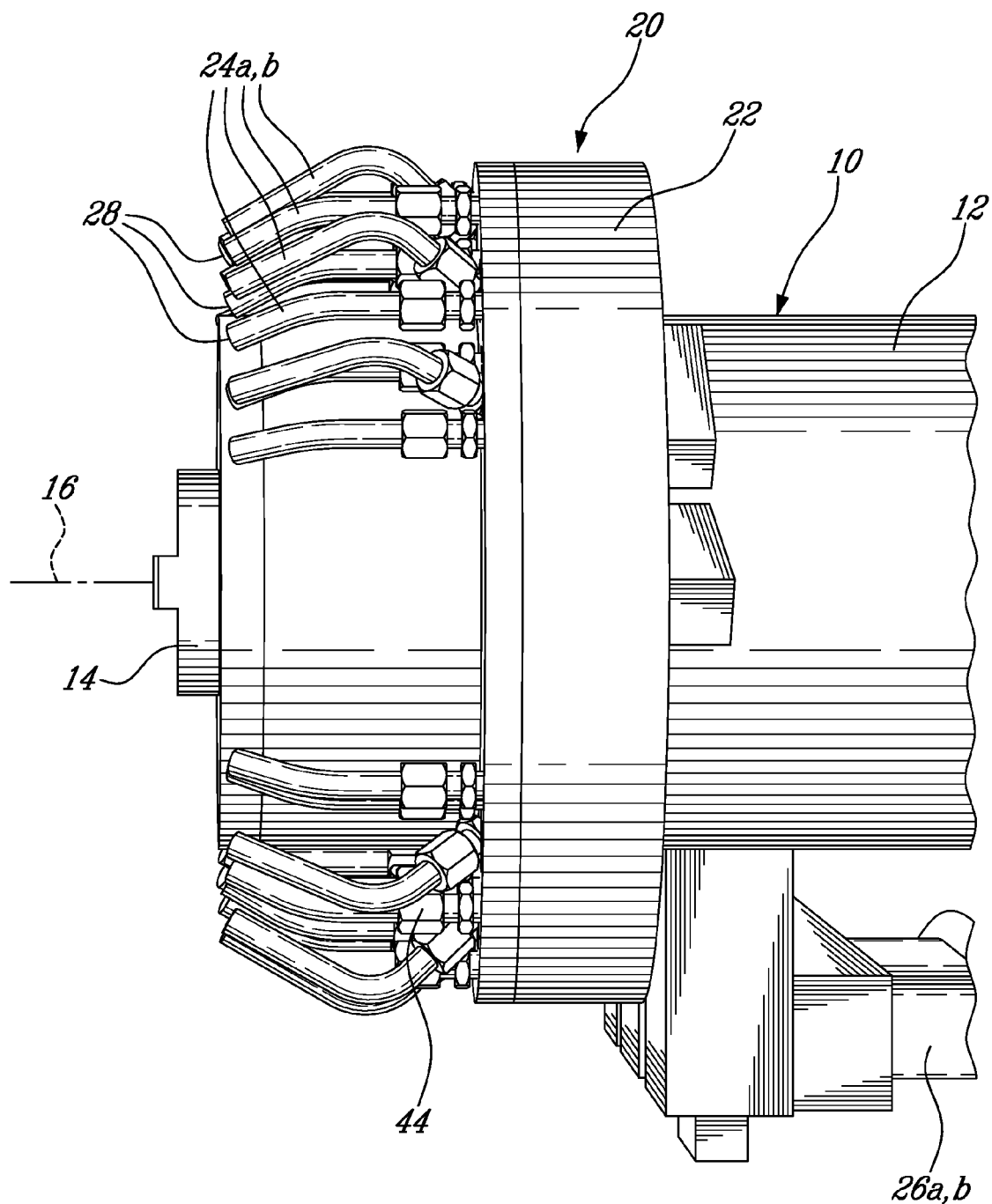
FIG. 1 is a schematic side view of a cooling apparatus installed on a CNC machine.

Referring to FIG. 1, a cooling apparatus 20 is installed on a CNC machine 10 (only partially shown). The CNC machine 10 includes a stationary spindle housing 12 supporting a spindle 14, the spindle 14 rotating a selected one of a plurality of cutting tools (not shown).

The cooling apparatus 20 includes a ring manifold 22 which is rigidly attached to the spindle housing 12 and from which extend a plurality of coolant fluid nozzles 24a,b. In a particular embodiment, the manifold 22 is slipped over the housing 12 and slid rearwards, and diametrically opposed fasteners, for example screws (not shown), are used to clamp the manifold 22 onto the spindle housing 12 and to center it radially with the spindle's axis of rotation 16. The manifold 22 is located radially by means of rigid inlet conduits 26a,b that extends from the rear of the manifold 22.

Alternately, the manifold 22 can be located radially by any other adequate type of retaining elements, for example by two sheet metal brackets extending forwards and bolted to the spindle bearing retainer, or by a circumferential ring clamp bearing upon three equally spaced clamping pads that are attached to the rear of the manifold, etc.

Figure 4:
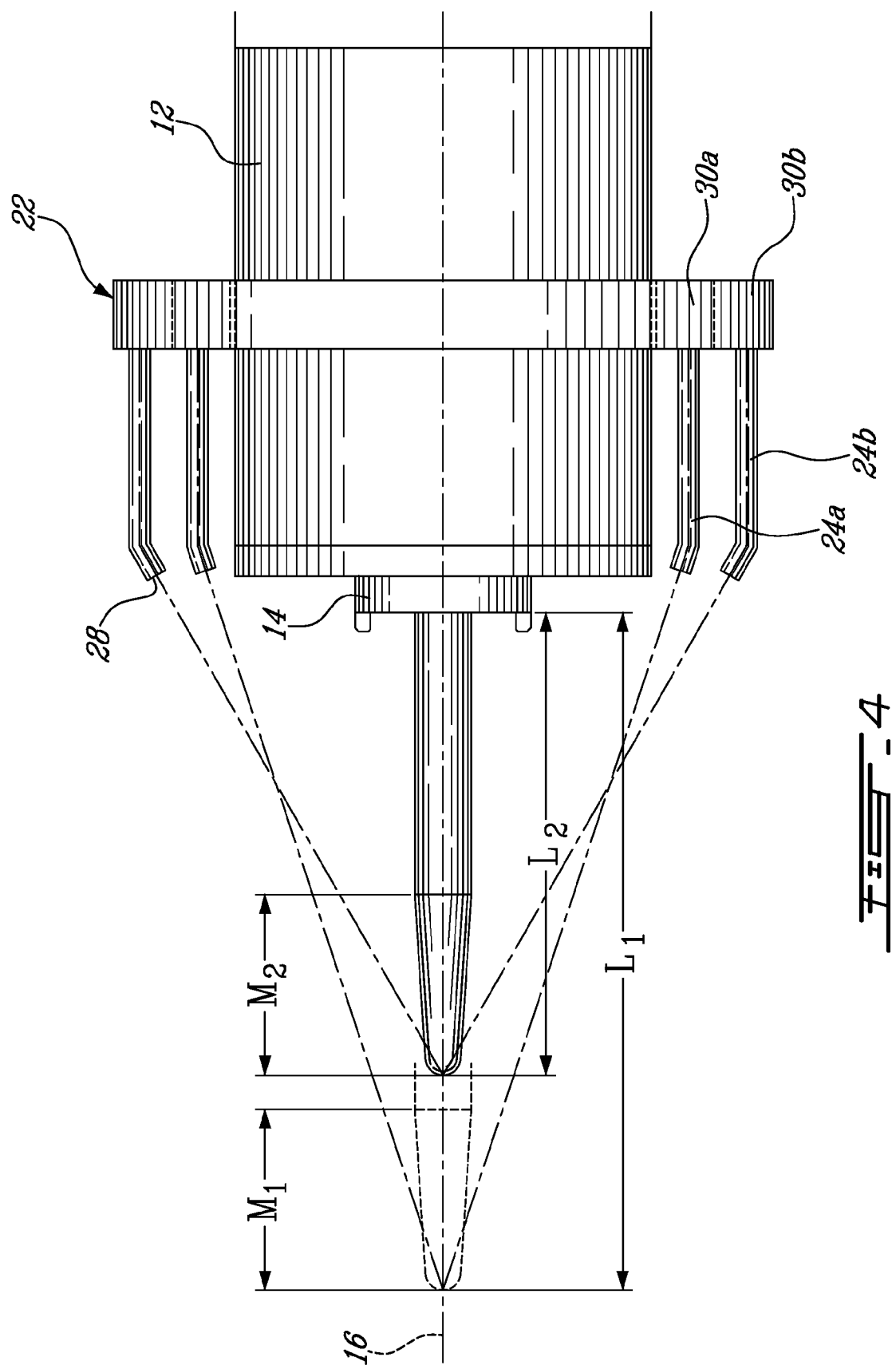
FIG. 4 is a schematic side view of the cooling apparatus of FIG. 1, showing the coolant distribution for each nozzle ring thereof.
Figure 5:
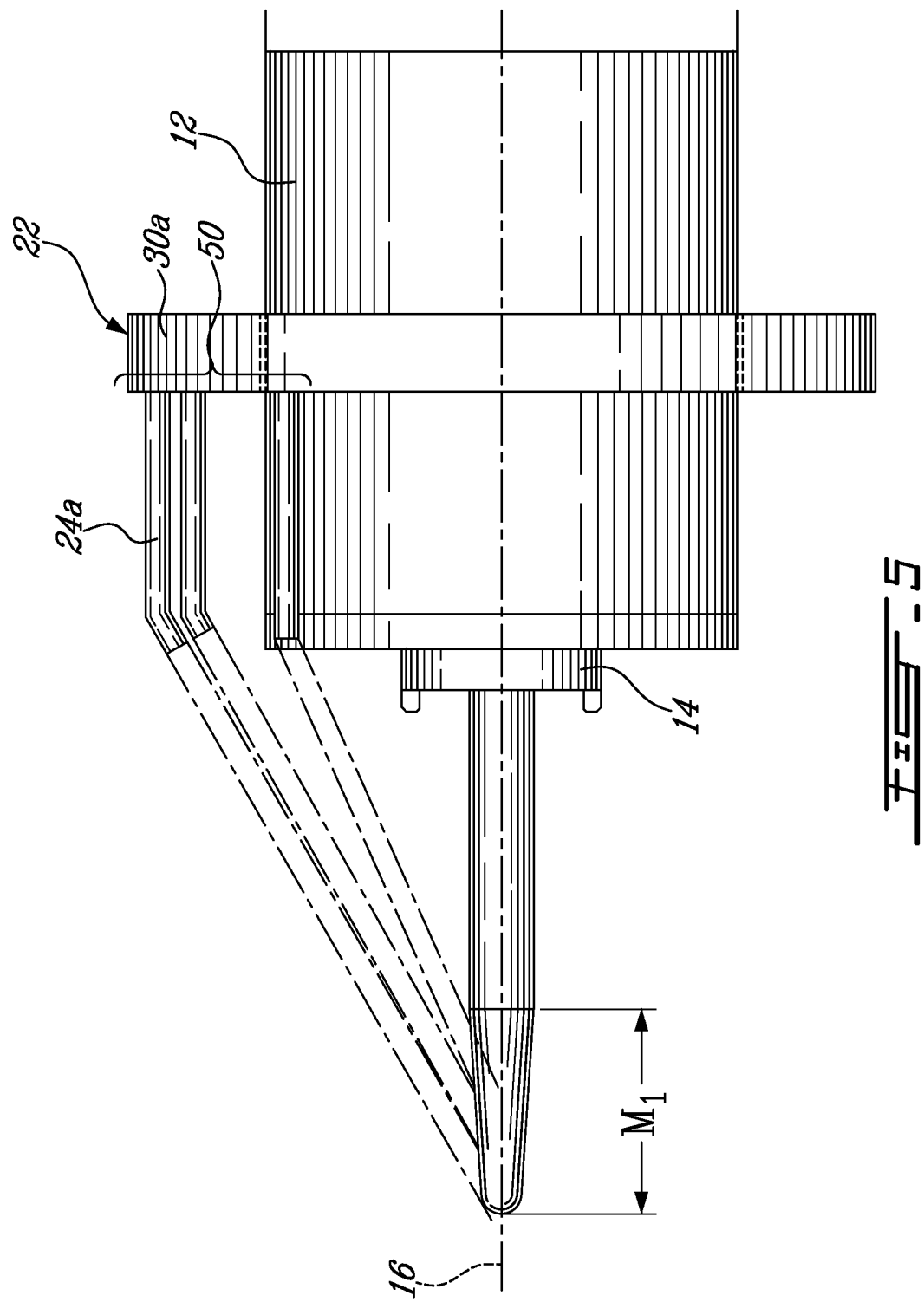
FIG. 5 is a schematic partial side view of the cooling apparatus of FIG. 4, showing the coolant distribution for a group of nozzles of one of the nozzle rings thereof.

It can be seen from FIGS. 4-5 that the tips or outlets 28 of the nozzles 24a,b are located behind the front face of the spindle 14, in order to avoid interference with the machine's capability to automatically change tool assemblies to and from the spindle 14. Each nozzle 24a,b is angled such that its outlet 28 is directed toward a tool to be received in the spindle 14, as will be further detailed below.

Figure 2:
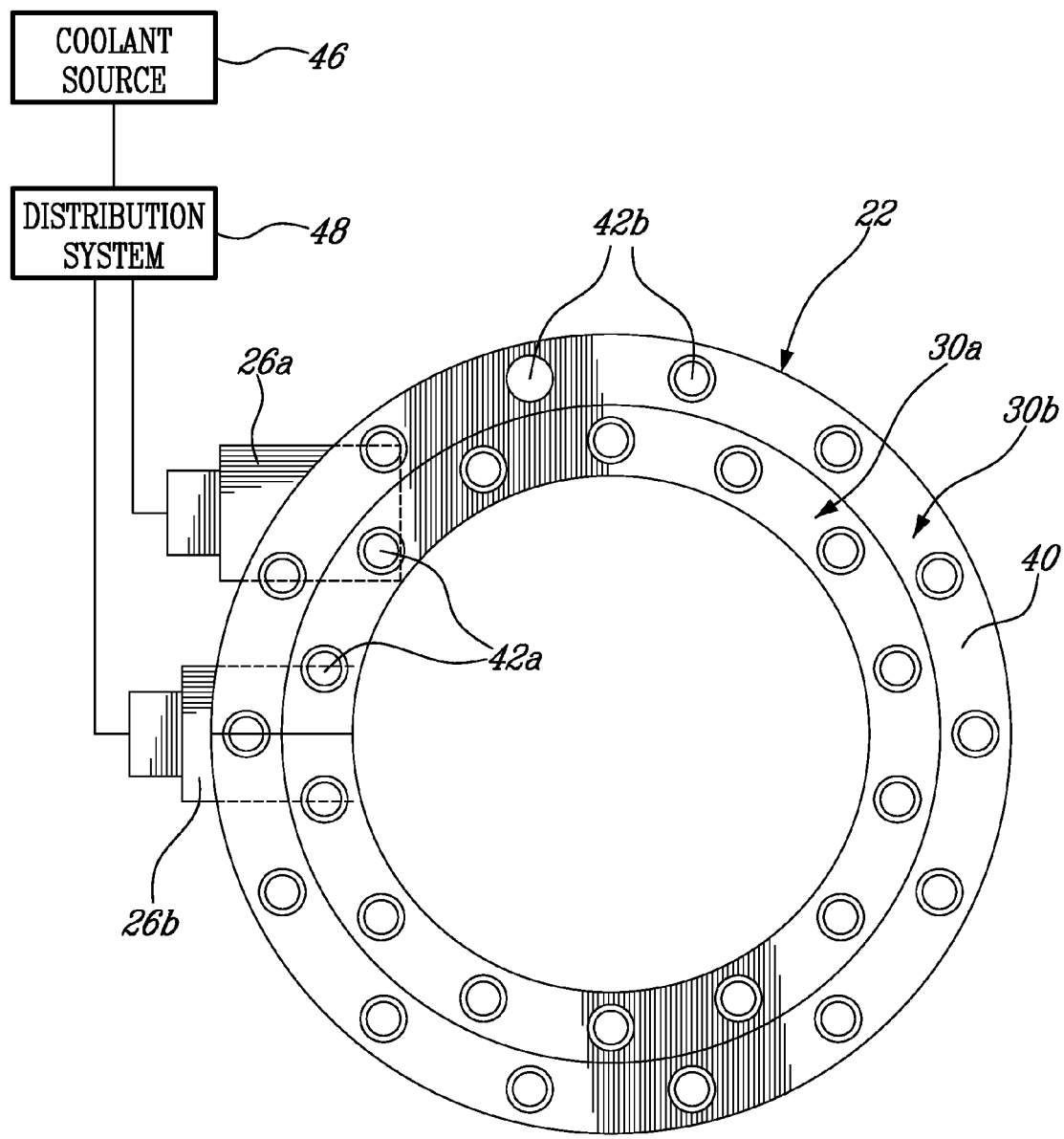
FIG. 2 is a schematic front view of a ring manifold of the cooling apparatus of FIG. 1.

Referring to FIG. 2, the ring manifold 22 defines two concentric nozzle rings 30a, 30b which, in the embodiment shown, each form a complete circle such as to completely surround the spindle. Each nozzle ring 30a,b is connected to a respective inlet conduit 26a, 26b.

Figure 3:
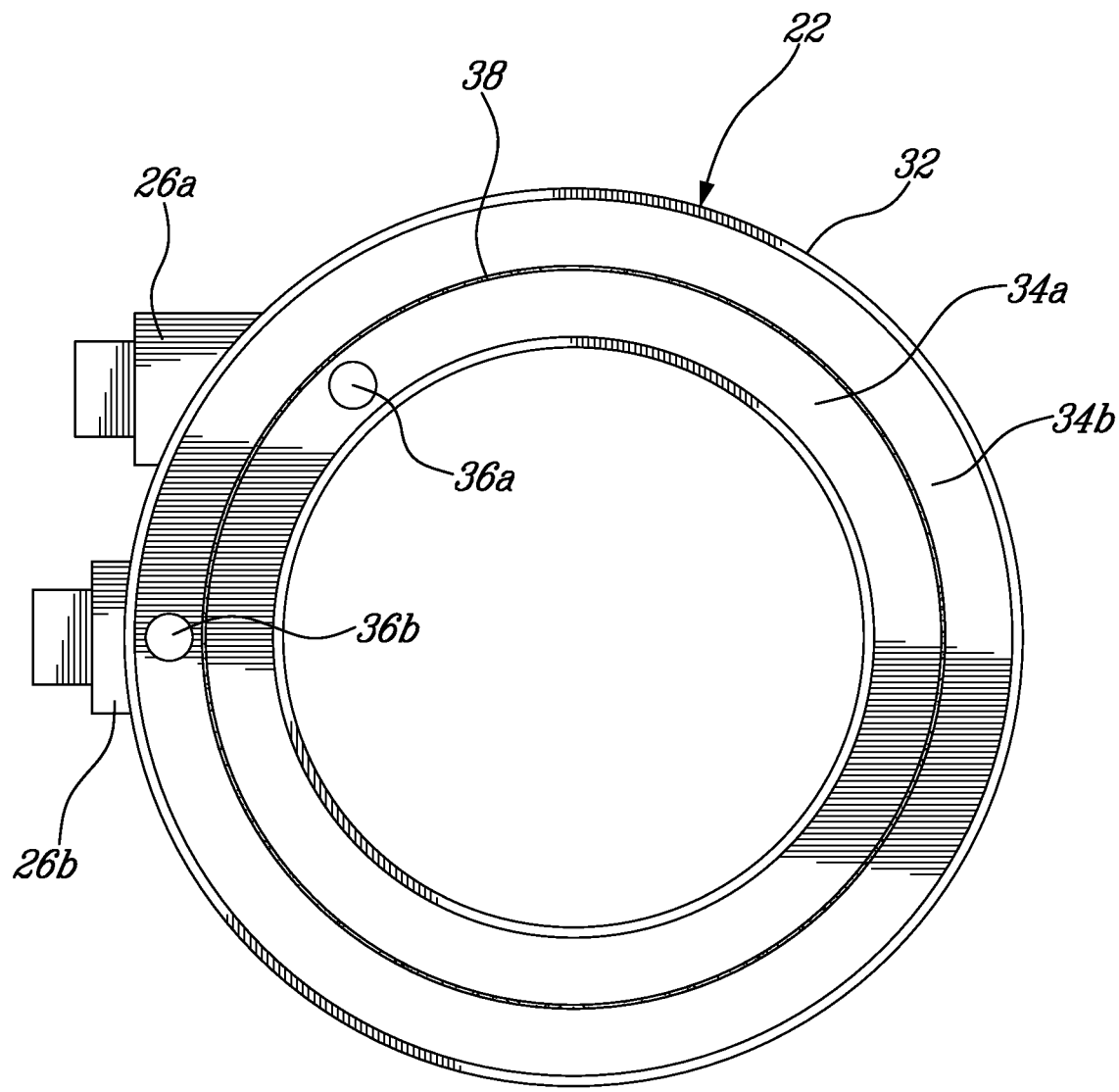
FIG. 3 is a schematic front view of a body of the ring manifold of FIG. 2.

Referring to FIG. 3, the manifold 22 includes an annular body 32 defining therein two concentric coolant passages 34a, 34b, one for each nozzle ring 30a,b, each coolant passage 34a,b forming a conduit for the coolant fluid. In a particular embodiment, the manifold body 32 is machined from a solid annular component, for example made of aluminium, to form the coolant passages 34a,b. The manifold body 32 also includes a fluid connection 36a, 36b between each coolant passage 35a,b and the respective inlet conduit 26a,b. The coolant passages 34a,b are sealed from each other through an annular gasket 38 that extends therebetween.

Referring back to FIG. 2, the manifold 22 also includes an annular cover 40, which engages the manifold body 32 and also seals the coolant passages 34a,b from one another. In a particular embodiment, the manifold cover 40 is bolted to the body 32; however, alternate means of attachment are also possible. The manifold cover 40 includes a series of threaded holes 42a, 42b defined therethrough in each of the nozzle rings 30a,b, in communication with the respective coolant passage 34a,b. Commercially available compression fittings 44 (see FIG. 1) are screwed into the threaded holes 42a,b and receive the coolant nozzles 24a,b, which are locked in place once their length and orientation is adjusted. In the embodiment shown, the threaded holes 42a,b of each nozzle ring 30a,b, and as such the coolant nozzles 24a,b thereof, are equally angularly spaced apart. Alternately, a different distribution of the nozzles 24a,b can be provided, for example having the nozzles 24a,b distributed around the circumference of the manifold 22 but with different distances between adjacent nozzles such that the nozzles 24a,b are not equally circumferentially spaced apart.

The nozzle rings 30a,b provide individual coolant delivery circuits that are independent from one another. Each inlet conduit 26a,b is connected to a coolant source 46 through a fluid distribution system 48, which pressurizes the coolant fluid and delivers it to a selected one or both of the nozzle rings 30a,b. The fluid distribution system 48 operates based on "On" and "Off" commands (M-codes) contained within the operating instructions or part program that is programmed into, and executed by, the CNC machine tool. For example, the "On" commands may be M08 for the inner nozzle ring and M20 for the outer nozzle ring and the "Off" command may be M09 for both nozzle rings; however, any available M-codes that have not been otherwise assigned by the machine tool builder or operator may alternately be used. During operation of the machine tool these coolant command M-codes can be programmed individually or in any combination.

In a particular embodiment, the fluid distribution system 48 includes a pump (not shown) in fluid communication with the coolant source 46 and a solenoid actuated valve (not shown) providing a selective connection between each of the inlet conduits 26a,b and the pump, the valve being actuated by the CNC commands. Alternately, more than one pump may be provided, and/or the inlet conduits 26a,b can be connected to the corresponding pump(s) through respective valves actuatable through the CNC commands.

Referring to FIG. 4, each nozzle ring 30a,b is assigned a specific range of tool lengths $L_1$, $L_2$ to cover. In the illustrated example, the inner nozzle ring 30a is assigned to a first tool length range $L_1$, for example 12 to 14 inches, and the outer nozzle ring 30b is assigned to a smaller, second tool length range $L_2$, for example 8 to 11 inches.

For each range of tool lengths $L_1$, $L_2$, a machining zone $M_1$, $M_2$ can be defined along the axis of rotation 16 of the spindle 14, which also corresponds to the longitudinal axis of the manifold 22. The machining zone $M_1$, $M_2$ contains the cutting edges of all of the tools within that range of tool lengths $L_1$, $L_2$, when each tool is installed in the spindle 14. Thus, each nozzle 24a extending from the inner ring 30a is oriented with the outlet 28 thereof directed toward at least a portion of the first machining zone $M_1$, where the cutting edge(s) of every tool within the first range of tool lengths $L_1$ are located, and each nozzle 24b extending from the outer ring 30b is oriented with the outlet 28 thereof directed toward at least a portion of the second machining zone $M_2$, where the cutting edge(s) of every tool within the second range of tool lengths $L_2$ are located. The machine tool programmer thus programs the selection of the nozzle ring 30a,b that is suitable for the length of the tool that he/she is programming for use next.

Although not shown, the tool lengths may alternately be distributed such that a first range corresponds to a first one of the nozzle rings, a second range to a second one of the nozzle rings, and a third, intermediate range is associated with both nozzle rings, so that when a tool from the third range is selected, both nozzle rings are actuated to direct the coolant fluid thereon. In that case, the nozzles of the first ring direct the coolant fluid along a first machining zone, the nozzles of the second ring direct the coolant fluid along a second machining zone which abuts the first machining zone, and the third machining zone is contained within the combination of the first and second machining zones.

The nozzles 24a,b are rigid, for example made of stainless steel tubing, and their orientation is pre-set during installation of the apparatus 20 on the machine tool 10; thus, no manual adjustment is necessary during the machining process, prior to, or following, automatic tool changes. The cooling apparatus 20 thus allows for different gauge lengths of tools to be lubricated through simple CNC commands, and provides for automatic tool changes without removing or adjusting the coolant nozzles.

Referring to FIG. 5, the nozzles 24a,b of each ring 30a,b (only the inner nozzle ring 30a being shown here) are arranged in at least two groups 50 (only one of which is shown) that are distributed around the circumference of the nozzle ring 30a,b, for example by having the groups 50 being at least substantially angularly spaced apart, and/or by having the groups 50 distributed in pairs of groups located in diametrically opposed locations around the nozzle ring 30a,b. In a particular embodiment, each group 50 includes three (3) nozzles 24a,b. The nozzles 24a,b within a same group 50 are targeted to a different portion of the respective machining zone $M_1$, $M_2$. In the embodiment shown, the different portions targeted by the nozzles 24a of the same group 50 together cover the entire machining zone $M_1$, such that each group 50 of nozzles provides coolant fluid along the entire machining zone $M_1$. The different groups 50 provide coolant fluid from different angular positions around the axis of rotation 16, in order to maintain coolant fluid delivery when the cooling fluid delivered by the nozzles 24a,b from one of the groups 50 is obstructed by un-machined material. The cooling apparatus 20 thus delivers cooling fluid targeted on several points along the cutting edges of each tool used, and from multiple directions around the circumference of the tool, thus facilitating the machining of contoured surfaces with the side of the tool during simultaneous multi-axis machining.

The orientation of each nozzle 24a,b can be confirmed by sliding a gauge-rod which is a precise fit with the inside of the nozzle in the nozzle outlet 28, the free end of the rod indicating where the projected coolant will contact the tool. Computer simulation can alternately be used to predict the contact point between the coolant and the tool. Once the original orientation of the nozzle 24a,b is selected, it is locked and remains the same, i.e. it does not change during the machining process.

Figure 6:
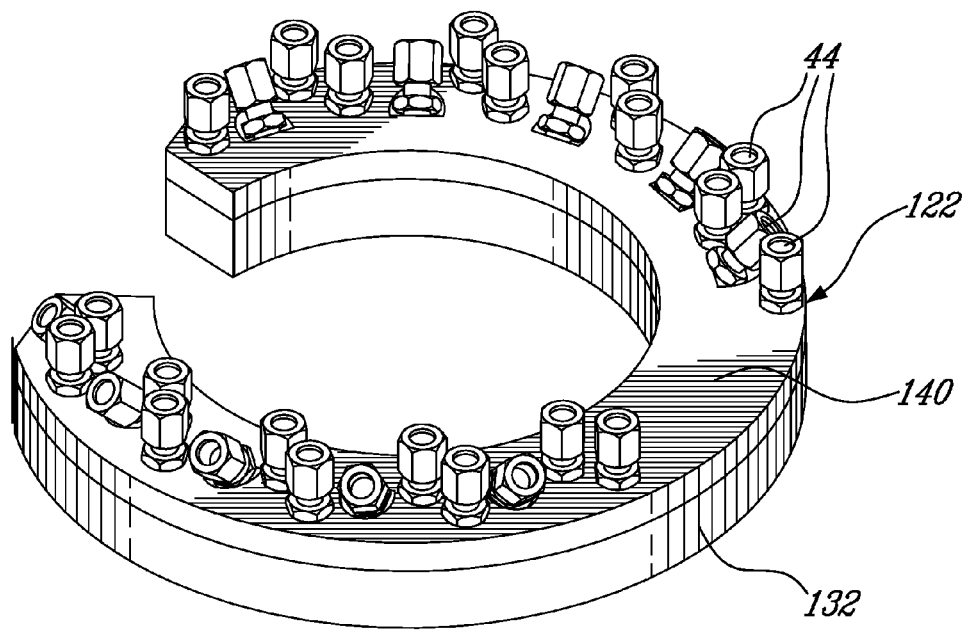
FIG. 6 is a schematic perspective view of an alternate ring manifold of the cooling apparatus of FIG. 1.

Referring to FIG. 6, a ring manifold 122 according to an alternate embodiment is shown. In this embodiment, the ring manifold 122 is in the form of an open ring, i.e. has a substantially "C"-shaped configuration, such that it substantially, but not completely, surrounds the spindle 14 when it is rigidly attached to the spindle housing 12. The manifold 122 includes a body 132 and a cover 142, and the manifold cover includes a plurality of compression fittings 44 attached thereto for each receiving a coolant fluid nozzle (not shown). As in the previous embodiment, the manifold 122 is attached to the spindle housing 12 such that the tips of the nozzles are located behind the front face of the spindle 14, in order to avoid interference with the machine's capability to automatically change tool assemblies to and from the spindle.

Figure 7:
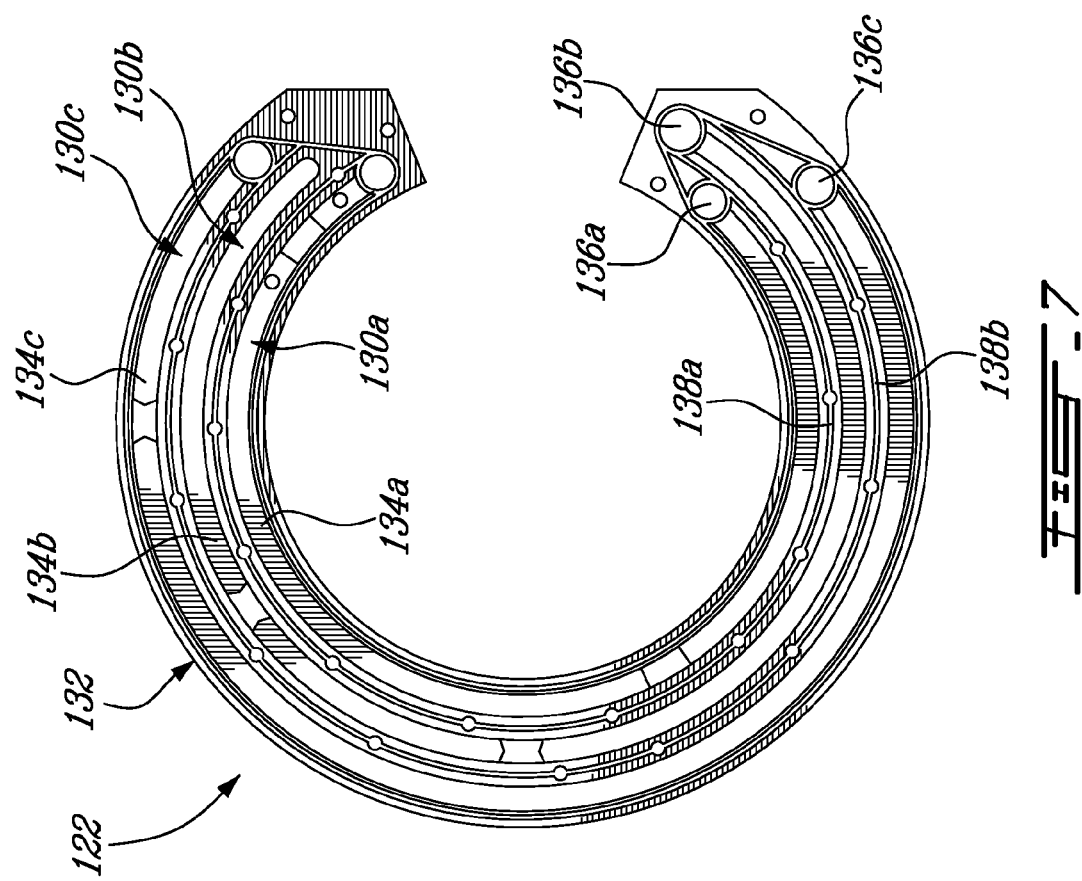
FIG. 7 is a schematic front view of a body of the ring manifold of FIG. 6.

Referring to FIG. 7, the manifold 122 defines three concentric nozzle rings 130a, 130b, 130c, each being connected to a respective inlet conduit in fluid communication with the coolant source (not shown). The manifold body 132 includes three concentric coolant passages 134a, 134b, 134c, one for each nozzle ring 130a,b,c, each coolant passage 134a,b,c forming a conduit for the coolant fluid. In a particular embodiment, the manifold body 132 is machined from a solid open ring component to form the coolant passages 14a,b,c. The manifold body 132 also includes a fluid connection 136a, 136b, 136c between each coolant passage 134a,b,c and the respective inlet conduit (not shown). The coolant passages 134a,b,c are sealed from each other through annular gaskets 138a, 138b that extend between adjacent ones of the coolant passages 134a,b,c.

Figure 8:
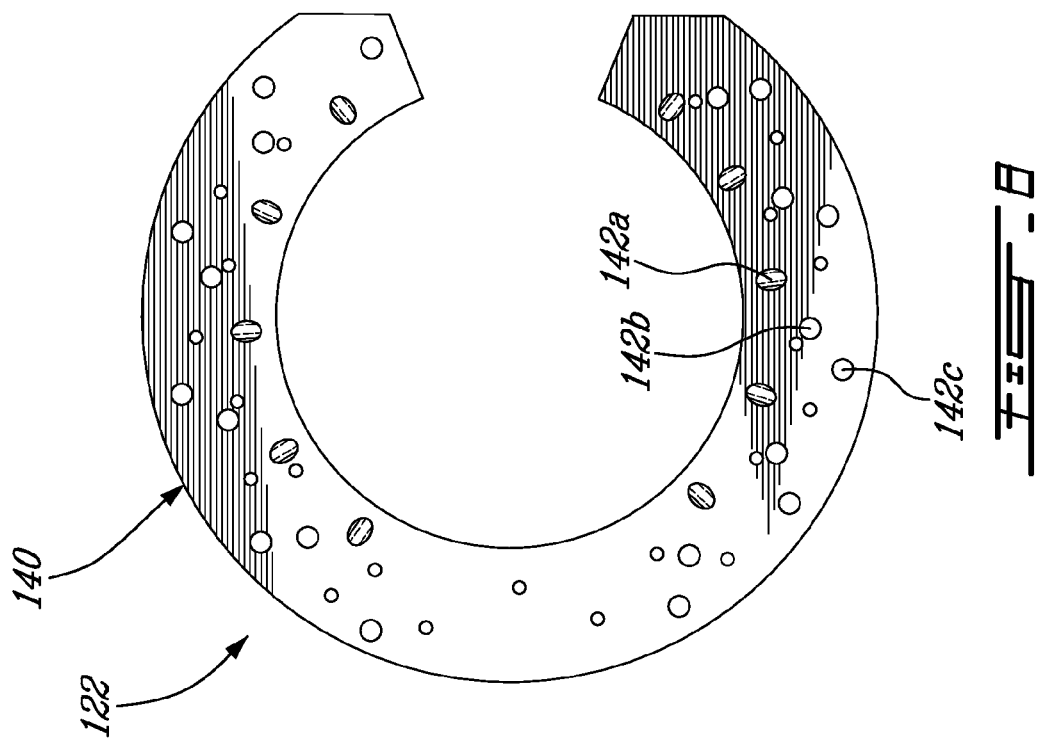
FIG. 8 is a schematic front view of a cover of the ring manifold of FIG. 6.

Referring to FIG. 8, the manifold cover 140 engages the manifold body 132 and also seals the coolant passages 134a,b,c from one another. The manifold cover 140 includes a series of threaded holes 142a, 142b, 142c defined therethrough in each of the nozzle rings 130a,b,c, in communication with the respective coolant passage 134a,b,c. The compression fittings 44 (see FIG. 6) are screwed into the threaded holes 142a,b,c and receive the coolant nozzles, which are locked in place once their length and orientation is adjusted. In the embodiment shown, the threaded holes 142a,b,c of each nozzle ring 130a,b,c, and as such the coolant nozzles thereof, are equally angularly spaced apart within each one of two diametrically opposed portions of the manifold 122.

As in the previous embodiment, the nozzle rings 130a,b,c provide individual coolant delivery circuits that are independent from one another. Each nozzle ring 130a,b,c receives coolant fluid from the fluid distribution system 48 which operates based on the "On" and "Off" commands (M-codes) contained within the part program of the CNC machine tool. As in the previous embodiment, each nozzle ring 130a,b,c is assigned a specific range of tool lengths to cover, such that the nozzles of each nozzle ring 130a,b,c are oriented with the outlet thereof directed toward a portion of the respective machining zone. As in the previous embodiment, the nozzles of each ring 130a,b,c are arranged in at least two groups that are distributed around the circumference of the nozzle ring, with the nozzles within a same group being targeted to a different portion of the respective machining zone.

In use, when machining a part with the CNC machine, a first tool is automatically selected through a corresponding command in the part program, and engaged with the spindle 14. Coolant fluid is directed on the machining zone of the first tool through the nozzles of the ring or rings 30a,b, 130a,b,c which are assigned to the length range corresponding to the length of the first tool selected, the nozzle ring or rings 30a,b, 130a,b,c being actuated through command(s) of the part program, and the part is machined with the first tool. When the first tool is automatically changed for a second tool, coolant fluid is directed on the machining zone of the second tool through the nozzles of the ring or ring(s) 30a,b, 130a,b,c which are assigned to the length range corresponding to the length of the second tool selected, which may or may not be the same as that of the first tool. Depending on the tool length, one or more of the nozzle rings 30a,b, 130a,b,c are activated, such that the corresponding machining zone receives coolant fluid. The nozzle ring(s) 30a,b, 130a,b,c are deactivated when required also through command(s) in the part program.

The above described cooling apparatus thus maintains coolant flow at the machining zone, and allows for unattended operation even through the use of tools of different lengths. The installation of the manifold 22, 122 on the stationary spindle housing 12 prevents the manifold 22, 122 from having an influence upon the practical operating speed and the dynamic balance of the spindle 14. The manifold 22, 122 can be retrofitted to any machine tool, whether its spindle 14 is attached to a linear axis, a tilting axis, or a rotary axis.

The above description is meant to be exemplary only, and one skilled in the art will recognize that changes may be made to the embodiments described without departing from the scope of the invention disclosed. For example, the nozzle rings 30a,b, 130a,b,c may be defined by distinct tubes instead as by coolant passages of a same manifold 22, 122. Also, more than three nozzle rings may be provided. Other modifications which fall within the scope of the present invention will be apparent to those skilled in the art, in light of a review of this disclosure, and such modifications are intended to fall within the appended claims.

The invention claimed is:

1. A method of machining a part with a machine tool having a stationary spindle housing supporting a spindle for rotating a selected one of a plurality of interchangeable cutting tools about an axis of rotation, the method comprising:

engaging a first one of the tools with the spindle such that cutting edges of the first tool are located in a first machining zone extending along a first portion of the axis of rotation;

directing coolant fluid to the first machining zone using a first nozzle ring mounted on the housing and including first nozzles directing the coolant fluid toward the first machining zone;

machining the part with the first tool;

removing the first tool from the spindle;

engaging a second one of the tools with the spindle such that cutting edges of the second tool are located in a second machining zone extending along a second portion of the axis of rotation, the second portion of the axis of rotation and the first portion of the axis of rotation at least partially overlapping;

directing the coolant fluid to the second machining zone using the first nozzle ring and a second nozzle ring simultaneously, the second nozzle ring mounted on the housing and including second nozzles directing the coolant fluid toward the second machining zone; and machining the part with the second tool.

2. The method as defined in claim 1, wherein directing the coolant fluid to the first machining zone includes activating coolant circulation through the first nozzle ring using a first machine command included in a program activating the machine tool, directing the coolant fluid to the second machining zone includes activating coolant circulation through the second nozzle ring using a second machine command included in the program, and further including deactivating the coolant circulation through the nozzle rings using a third machine command included in the program after machining the part.

3. The method as defined in claim 1, further comprising, after machining the part with the second tool:

removing the second tool from the spindle;

engaging a third one of the tools with the spindle such that cutting edges of the third tool are located in a third machining zone extending along a third portion of the axis of rotation different from the first and second portions;

directing the coolant fluid to the third machining zone using at least a third nozzle ring mounted on the housing and including third nozzles directing the coolant fluid toward the third machining zone; and machining the part with the third tool.

4. The method as defined in claim 1, wherein directing the coolant fluid to the first machining zone includes directing the coolant fluid on a same set of points on the first machining zone from at least two different angular positions around the spindle, and directing the coolant fluid to the second machining zone includes directing the coolant fluid on a same set of points on the second machining zone from at least two different angular positions around the spindle.

* * * * *